US011570007B2

(12) United States Patent
Hukmani (10) Patent No.: US 11,570,007 B2
(45) Date of Patent: Jan. 31, 2023

(54) QUANTUM-LEVEL CRYPTOGRAPHY FOR DELEGATED DIGITAL SIGNATURES

(71) Applicant: BANK OF AMERICA CORPORATION, Charlotte, NC (US)

(72) Inventor: Ravi Kiran Hukmani, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 69 days.

(21) Appl. No.: 17/176,256

(22) Filed: Feb. 16, 2021

(65) Prior Publication Data
US 2022/0263665 A1    Aug. 18, 2022

(51) Int. Cl.
H04L 29/06    (2006.01)
H04L 9/32     (2006.01)
H04L 9/08     (2006.01)
H04L 9/14     (2006.01)

(52) U.S. Cl.
CPC ............ *H04L 9/3257* (2013.01); *H04L 9/085* (2013.01); *H04L 9/0852* (2013.01); *H04L 9/14* (2013.01)

(58) Field of Classification Search
None
See application file for complete search history.

(56) References Cited

U.S. PATENT DOCUMENTS

| | | | | |
|---|---|---|---|---|
| 8,913,900 B2 * | 12/2014 | Lukin | ............... | H04B 10/90 398/176 |
| 10,891,555 B2 * | 1/2021 | Ashrafi | ............... | H04L 9/0858 |
| 10,958,439 B2 * | 3/2021 | Hong | ............... | H04L 9/3247 |
| 11,121,878 B2 * | 9/2021 | McCarty | ............... | H04L 63/18 |
| 11,164,104 B2 * | 11/2021 | Ashrafi | ............... | H04L 9/0852 |
| 11,477,015 B1 * | 10/2022 | Smith | ............... | G06N 10/00 |
| 2015/0222619 A1 * | 8/2015 | Hughes | ............... | H04L 63/083 713/168 |
| 2016/0041411 A1 * | 2/2016 | Ashrafi | ............... | G02F 1/0121 250/492.2 |
| 2016/0218867 A1 * | 7/2016 | Nordholt | ............... | H04L 9/0852 |
| 2017/0331623 A1 * | 11/2017 | Fu | ............... | H04B 10/85 |
| 2019/0268146 A1 * | 8/2019 | Samid | ............... | H04L 9/0852 |
| 2020/0050959 A1 * | 2/2020 | Ashrafi | ............... | G06N 3/0635 |
| 2021/0083866 A1 * | 3/2021 | Bush | ............... | H04L 9/0852 |
| 2021/0105135 A1 * | 4/2021 | Figueroa | ............... | H04L 9/0858 |
| 2021/0126800 A1 * | 4/2021 | De La Rocha Gómez-Arevalillo | ............... | H04L 9/0852 |
| 2021/0203493 A1 * | 7/2021 | Chen | ............... | G06F 17/14 |

\* cited by examiner

*Primary Examiner* — Maung T Lwin
(74) *Attorney, Agent, or Firm* — Moore & Van Allen PLLC; James C. Edwards (57) ABSTRACT

Quantum-level cryptography of delegated digital signatures. By implementing quantum-level computing principles, delegate signatures are provided that are unclonable, unforgeable and can not be repudiate. Specifically, at least four quantum particles are entangled, with one particle assigned to each of a third-party verification entity, a signature delegate, a delegatory signature authorizer entity and a signature requester entity. In addition, Bell State measurements (BSMs) are performed at the signature delegate, the delegatory signature authorizer entity and the third-party verification entity to allow the original signer (i.e., the signature delegator) to securely delegate signature to a signature delegate and perform an event, such as a payment process or the like.

20 Claims, 3 Drawing Sheets

QUANTUM-LEVEL CRYPTOGRAPHY FOR DELEGATED DIGITAL SIGNATURES

FIELD OF THE INVENTION

The present invention relates to quantum-level cryptography and, more specifically, implementing quantum-level cryptography for delegated digital signatures.

BACKGROUND

In digital signature communication cryptographic techniques play a vital role in ensuring the integrity of the digital signature. A specific digital signature protocol allows an entity referred to as a signature delegator, otherwise referred to as a designator or original signer, to delegate another entity referred to a signature delegate to sign on behalf of signature delegator. Such a protocol is typically implemented in instances in which the signature delegator is temporarily unavailable/incapacitated, lacks computational power/resources or under time constraints that the signature delegator is unable to meet.

In existing digital technology, delegate signatures contain classical signature group label names that are based on computational complexity problems, therefore the methodologies tend to be unsecure and, as a result, are not safe in many operations.

Therefore, a need exists to develop systems, methods, computer program products and the like that provide for absolute security in delegate signature protocols. Specifically, the desired systems, methods, computer program products and the like should impart strong unforgeability, identifiability and undeniability into the digital delegate signature process. Strong unforgeability means that third parties, as well as the signature delegator, who are not designated as delegate signers cannot create a valid delegate signature. Strong identifiability means that any party can determine the identity of the corresponding signature delegate from the delegate's signature. Strong undeniability means that a signature delegate cannot repudiate or otherwise reject a delegate signature after they have created it.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for quantum-level cryptography of delegated digital signatures. By implementing quantum-level computing principles the present invention provides delegate signatures that are unclonable, unforgeable and can not be repudiate. In other words quantum-level computing provides for delegate signatures with absolute security, which is not possible using only conventional classical computing protocols.

Specifically, the present invention provides for entangling at least four quantum particles, with one particle assigned to each of a third-party verification entity (e.g., third-party payment authority), a signature delegate, a delegatory signature authorizer entity (e.g., a financial institution) and a signature requester entity (e.g., a merchant). In specific embodiments of the invention, six quantum particles are entangled with two particles assigned to both the third-party verification entity and the delegatory signature authorizer entity.

Moreover, the present invention provides for Bell State measurements (BSMs) to be made at the signature delegate, the delegatory signature authorizer entity and the third-party verification entity to allow the original signer (i.e., the signature delegator) to securely delegate signature to a signature delegate and perform an event, such as a payment process or the like.

A system for quantum-level cryptography of delegated digital signatures defines first embodiments of the invention. The system includes a signature delegator computing platform including a first memory and a first processing device in communication with the first memory; a third-party validator computing platform including a second memory and a second processing device in communication with the second memory; a signature delegate computing platform including a third memory and a third processing device in communication with the third memory; a delegatory signature authorizer computing platform including a fourth memory and a fourth processing device in communication with the fourth memory; and a signature requester computing platform including a fifth memory and fifth processing device in communication with fifth memory.

In specific embodiments of the system, the signature delegator is a financial transaction transactor, such as a borrower or the like, the delegatory signature authorizer is a financial institution and the signature requester is the other party to the financial transaction, such as a merchant or the like.

According to the system, the third-party validator computing platform, the signature delegate computing platform, the delegatory signature authorizer computing and the signature requester computing platform further comprise a quantum-level computing platform having quantum-level memory and a quantum level processing device in communication with the quantum-level memory. Further, a quantum state is established amongst the quantum-level computing platforms by entangling at least four quantum particles and assigning at least one quantum particle to each of the quantum-level computing platforms.

In addition, the system provides for the quantum-level processing devices of the quantum-level computing platforms to be configured to perform a Bell state measurement (BSM) that allows a signature delegate to authorize to delegate a signature delegate to provide a digital signature on behalf of the signature delegate to conduct an event requiring signature.

In specific embodiments of the system, an encryption process is established by generating and sharing (i) a first encryption key shared between the signature delegator computing platform and the third-party validator computing platform, (ii) a second encryption key shared between the signature delegate computing platform and the third-party validator computing platform, (iii) a third encryption key shared between the delegatory signature authorizer computing platform and the third-party validator computing platform, and (iv) a fourth encryption key shared between the signature requester computing platform and the third-party validator computing platform.

In other specific embodiments of the system, the quantum-level computing platform of the signature delegate computing platform is configured to prepare at least four quantum particles and assign at least one particle to each of the quantum-level computing platforms of the third-party validator computing platform, the delegatory signature authorizer computing and the signature requester computing platform. In specific related embodiments of the system, the quantum-level computing platform of the signature delegate computing platform is configured to prepare six quantum particles, retain a first one of the six quantum particles, and assign (i) a second and third ones of the six quantum particles to the quantum-level computing platform of the third-party validator computing platform, (ii) a fourth one of the six quantum particles to the quantum-level computing platform of the signature requester computing platform, and (iii) a fifth and sixth ones of the six quantum particles to the quantum-level computing platform of the delegatory signature authorizer computing platform.

In further specific embodiments of the system, the signature delegator computing platform further includes first instructions that are stored in the first memory, and executable by the first processing device, The first instructions are configured to (i) generate a classification number and convert to quantum state, (ii) blind information associated with the event, (iii) encrypt the blinded information and the classification number using the first encryption key, and (iv) communicate the encrypted blinded information and the classification number to the third-party validator computing platform.

In related specific embodiments of the system, the third-party validator computing platform further includes second instructions that are stored in the second memory and executable by the second processing device. The second instructions are configured to (i) receive and decrypt the encrypted blinded information and classification number using the first encryption key, (ii) encrypt (a) a signature request and the classification number using the second encryption key, and (b) the classification number using the third encryption key, and (iii) communicate (a) the encrypted signature request and the classification number to the signature delegate computing platform and (b) the encrypted classification number to the delegatory signature authorizer computing platform.

In further related specific embodiments of the system, the signature delegate computing platform further includes third instructions that are stored in the third memory, and executable by the third processing device. The third instructions are configured to (i) receive and decrypt the encrypted signature request and the classification number using the second encryption key, (ii) implement the quantum-level computing platform of the signature delegate computing platform to conduct a first Bell state measurement (BSM), (iii) encrypt a signature request response including an electronic signature of the delegate and the classification number, and (iv) communicate (a) the encrypted signature request, and the classification number to the third-party validator computing platform and (b) the signature request to the delegatory signature authorizer.

In additional related specific embodiments of the system, the delegatory signature authorizer computing platform includes fourth instructions that are stored in the fourth memory and executable by the fourth processing device. The fourth instructions are configured to (i) receive and decrypt the encrypted classification number using the third encryption key, (ii) receive the signature request, (iii) verify that the delegate has signature authorization for the delegator and a signature requester, (iv) implement the quantum-level computing platform of the delegatory signature authorizer computing platform to conduct a second Bell state measurement (BSM), (v) encrypt a signature authorization response including the electronic signature of the delegate, results of the second BSM and the classification number, and (vi) communicate the encrypted signature authorization response, results of the second BSM and the classification number to the third-party validator computing platform.

In other relates specific embodiments of the system, the second instructions are further configured to (i) receive and decrypt (a) the signature request response using the second encryption key, and (b) the signature authorization response using the third encryption key, (ii) verify an identity of the signature delegate based on the electronic signature in (a) the signature request response and (b) the signature authorization response, (iii) implement the quantum-level computing platform of the third-party validator computing platform to conduct a third Bell state measurement (BSM), and (iv) decrypt a sum of (a) a result of the identity verification, (b) the result of the second BSM and, (c) the result of the third BSM) and communicate the decrypted sum to the signature delegate computing platform and the delegate signatures received from the signature delegate computing platform and the delegatory signature authorizer computing platform. In related embodiments of the system, the third instructions are further configured to validate the delegate signatures and communicate a validated signature response to the third-party validator computing platform.

Moreover, in other related embodiments of the system, the second instructions are further configured to (i) implement the quantum-level computing platform of the third-party validator computing platform to conduct a Von Neumann measurement, (ii) encrypt the information associated with the event and the delegate signature using the fourth encryption key, and (iii) communicate the encrypted information associated with the event and delegate signature to the signature requester computing platform.

In still further related specific embodiments of the system, the signature requester computing platform further includes fifth instructions that are stored in the fifth memory, and executable by the fifth processing device. The fifth instructions are configured to receive and decrypt the information associated with the event and delegate signature using the fourth encryption key and confirm the delegate signature.

A computer-implemented method for quantum-level cryptography of delegated digital signatures defines second embodiments of the invention. The method is implemented by one or more computing processing devices. The method includes generating and sharing (i) a first encryption key shared between a signature delegator computing platform and a third-party validator computing platform, (ii) a second encryption key shared between a signature delegate computing platform and the third-party validator computing platform, (iii) a third encryption key shared between a delegatory signature authorizer computing platform and the third-party validator computing platform, and (iv) a fourth encryption key shared between a signature requester computing platform and the third-party validator computing platform. The method further includes establishing a quantum state amongst a quantum-level computing platform included within each of the third-party validator computing platform, the signature delegate computing platform, the delegatory signature authorizer computing platform and the signature requester computing platform by entangling at least four quantum particles and assigning at least one quantum particle to each of the quantum-level computing platforms of the third-party validator computing platform, the signature delegate computing platform, the delegatory signature authorizer computing platform and the signature requester computing platform. In addition the method includes performing, at the quantum-level computing platform of each of the third-party validator computing platform, the signature delegate computing platform, the delegatory signature authorizer computing platform, a Bell state measurement (BSM) that allows a signature delegate to authorize to delegate a signature delegate to provide a digital signature on behalf of the signature delegate to conduct an event requiring signature.

In specific embodiments of the computer-implemented method, establishing the quantum state further includes preparing, by the quantum-level computing platform of the signature delegate computing platform, six quantum particles and retaining a first one of the six quantum particles, and assigning (i) a second and third ones of the six quantum particles to the quantum-level computing platform of the third-party validator computing platform, (ii) a fourth one of the six quantum particles to the quantum-level computing platform of the signature requester computing platform, and (iii) a fifth and sixth ones of the six quantum particles to the quantum-level computing platform of the delegatory signature authorizer computing platform.

In other specific embodiments the method further includes (i) generating, by the signature delegator computing platform, a classification number and converting the classification to a quantum state, (ii) blinding, by the signature delegator computing platform, information associated with the event; and (iii) encrypting the blinded information and the classification number using the first encryption key and communicating the encrypted blinded information and the classification number to the third-party validator computing platform.

In still further specific embodiments the computer-implemented method further includes (i) receiving and decrypting, by the signature delegate computing platform, an encrypted signature request and the classification number using the second encryption key, (ii) implementing the quantum-level computing platform of the signature delegate computing platform to conduct a first Bell state measurement (BSM), (iii) encrypting, by the signature delegate computing platform, a signature request response including an electronic signature of the delegate and the classification number, and (iv) communicating, by the signature delegate computing platform, (a) the encrypted signature request, and the classification number to the third-party validator computing platform and (b) the signature request to the delegatory signature authorizer.

A computer program product including a non-transitory computer-readable medium defines third embodiments of the invention. The computer-readable medium included a first set of codes for causing a computer to generate and share (i) a first encryption key shared between a signature delegator computing platform and a third-party validator computing platform, (ii) a second encryption key shared between a signature delegate computing platform and the third-party validator computing platform, (iii) a third encryption key shared between a delegatory signature authorizer computing platform and the third-party validator computing platform, and (iv) a fourth encryption key shared between a signature requester computing platform and the third-party validator computing platform.

The computer-readable medium additionally includes a second set of codes for causing a computer to establish a quantum state amongst a quantum-level computing platform included within each of the third-party validator computing platform, the signature delegate computing platform, the delegatory signature authorizer computing platform and the signature requester computing platform by entangling at least four quantum particles and assigning at least one quantum particle to each of the quantum-level computing platforms of the third-party validator computing platform, the signature delegate computing platform, the delegatory signature authorizer computing platform and the signature requester computing platform.

In addition, the computer-readable medium includes a third set of codes for causing a computer to perform, at the quantum-level computing platform of each of the third-party validator computing platform, the signature delegate computing platform, the delegatory signature authorizer computing platform, a Bell state measurement (BSM) that allows a signature delegate to authorize to delegate a signature delegate to provide a digital signature on behalf of the signature delegate to conduct an event requiring signature.

In further specific embodiments of the computer program product, the second set of codes is further configured to cause the computer to prepare, by the quantum-level computing platform of the signature delegate computing platform, six quantum particles and retaining a first one of the six quantum particles, and assigning (i) a second and third ones of the six quantum particles to the quantum-level computing platform of the third-party validator computing platform, (ii) a fourth one of the six quantum particles to the quantum-level computing platform of the signature requester computing platform, and (iii) a fifth and sixth ones of the six quantum particles to the quantum-level computing platform of the delegatory signature authorizer computing platform.

In additional specific embodiments the computer program product, the computer-readable medium further includes a fourth set of codes for causing the signature delegator computing platform to (i) generate a classification number and converting the classification to a quantum state, (ii) blind information associated with the event, (iii) encrypt the blinded information and the classification number using the first encryption key and (iv) communicate the encrypted blinded information and the classification number to the third-party validator computing platform.

Moreover, in further embodiments of the computer program product, the computer-readable medium further includes a fifth set of codes for causing the signature delegate computing platform to (i) receive and decrypt an encrypted signature request and the classification number using the second encryption key, (ii) implement the quantum-level computing platform of the signature delegate computing platform to conduct a first Bell state measurement (BSM), (iii) encrypt a signature request response including an electronic signature of the delegate and the classification number, and (iv) communicate (a) the encrypted signature request, and the classification number to the third-party validator computing platform and (b) the signature request to the delegatory signature authorizer.

Thus, systems, apparatus, methods, and computer program products herein described in detail below provide for quantum-level cryptography of delegated digital signatures. By implementing quantum-level computing principles the present invention provides delegate signatures that are unclonable, unforgeable and can not be repudiate. Specifically, the present invention provides for entangling at least four quantum particles, with one particle assigned to each of a third-party verification entity, a signature delegate, a delegatory signature authorizer entity and a signature requester entity. In addition, the invention provides for Bell State measurements (BSMs) to be made at the signature delegate, the delegatory signature authorizer entity and the third-party verification entity to allow the original signer (i.e., the signature delegator) to securely delegate signature to a signature delegate and perform an event, such as a payment process or the like.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as Q SHARP (Q#), PYTHON, JAVA, PERL, SMALLTALK, C++, SPARK SQL, HADOOP HIVE or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" or "configured for" perform (or "configured for" performing) a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention provide for quantum-level cryptography of delegated digital signatures. By implementing quantum-level computing principles the present invention provides delegate signatures that are unclonable, unforgeable and can not be repudiate. In other words quantum-level computing provides for delegate signatures with absolute security, which is not possible using only conventional classical computing protocols.

Specifically, the present invention provides for entangling at least four quantum particles, with one particle assigned to each of a third-party verification entity (e.g., third-party payment authority), a signature delegate, a delegatory signature authorizer entity (e.g., a financial institution) and a signature requester entity (e.g., a merchant). In specific embodiments of the invention, six quantum particles are entangled with two particles assigned to both the third-party verification entity and the delegatory signature authorizer entity.

Moreover, the present invention provides for Bell State measurements (BSMs) to be made at the signature delegate, the delegatory signature authorizer entity and the third-party verification entity to allow the original signer (i.e., the signature delegator) to securely delegate signature to a signature delegate and perform an event, such as a payment process or the like.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Quantum computing involves theoretical computation systems that make direct use of quantum-mechanical phenomena, such as superposition and entanglement, to perform operations on data. Whereas common digital computing, otherwise referred to herein as classical computing, requires that the data be encoded into binary digits (i.e., bits), each of which is always in one of two definite states (0 or 1), quantum computation encode data onto quantum bits, referred to herein as qubits, which can be in superpositions of states. Unlike conventional bits, however, qubits exhibit quantum behavior, allowing the quantum computer to process a vast number of calculations simultaneously. A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three-qubit system can store the information of eight classical bits, four qubits can store the information of sixteen classical bits, and so on. A quantum computer with three hundred qubits could possess the processing power equivalent to the number of atoms in the known universe.

In this regard, quantum computing allows for a more robust computing environment, in which much larger volumes of data can be processed in much shorter periods of time than would otherwise be realized by a classical computer apparatus.

Figure 1:
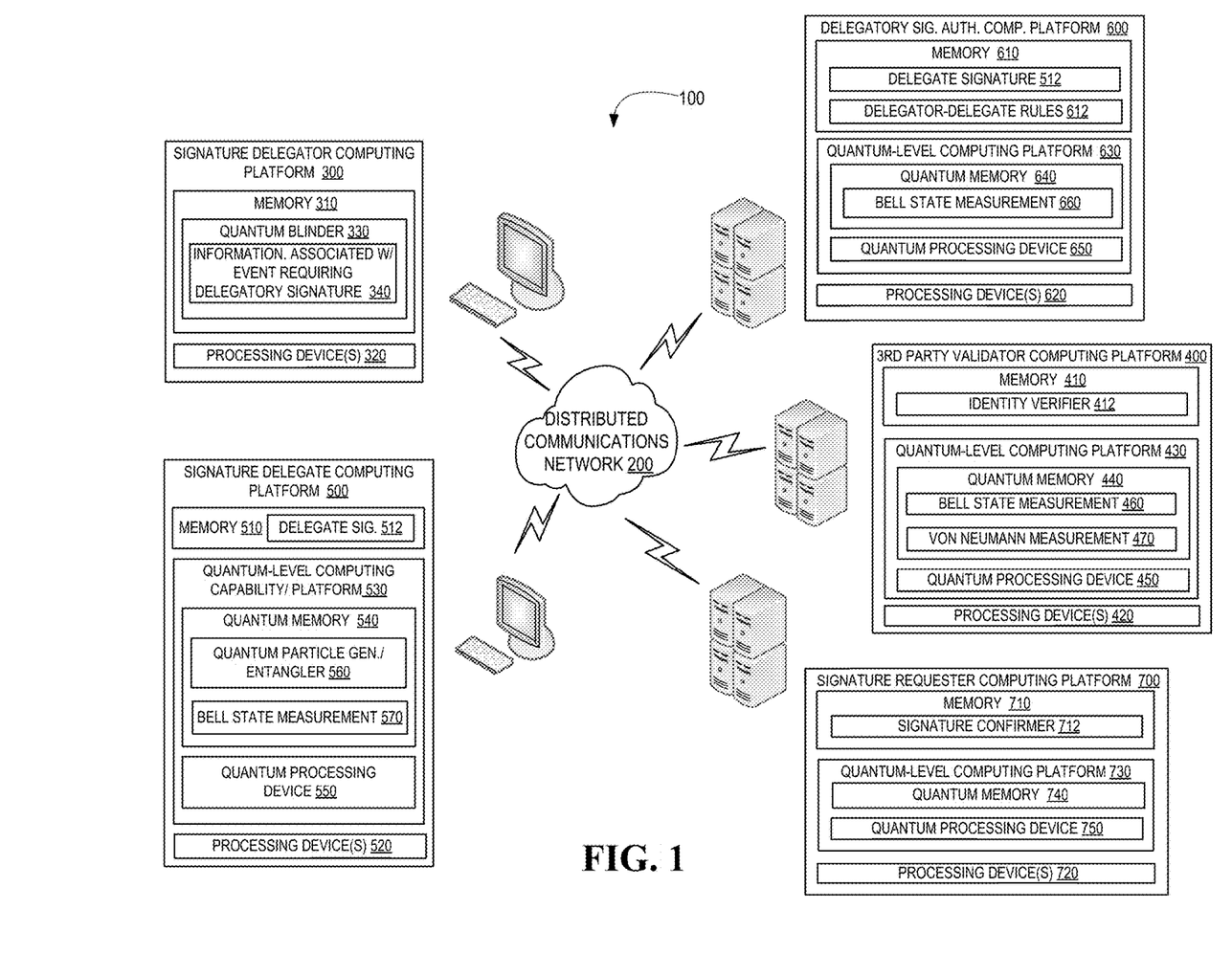
FIG. 1 is a schematic/block diagram of a system for implementing quantum-level cryptography for delegated digital signatures, in accordance with embodiments of the present invention.

Turning now to the figures, FIG. 1 illustrates a system 100 for quantum-level cryptography of delegated digital signatures, in accordance with embodiments of the present invention. The system is implemented in a distributed communication network 200 that may comprise wired or wireless networks, including, but not limited to, the Internet, one or more intranets, cellular networks or the like. The system includes a signature delegate computing platform 300, a third-party signature validator computing platform 400, a signature delegate computing platform 500, a delegatory signature authorized computing platform 600 and a signature requester computing platform 700.

The third-party signature validator computing platform 400, the signature delegate computing platform 500, the delegatory signature authorized computing platform 600 and a signature requester computing platform 700 quantum-level computing capabilities such that a quantum state is established amongst the platforms 400, 500, 600 and 700 by entangling at least four quantum particles and assigning at least one quantum particle to each of the platforms 400, 500, 600 and 700.

In addition, the quantum-level computing capabilities of the third-party signature validator computing platform 400, the signature delegate computing platform 500, the delegatory signature authorized computing platform 600 are configured to perform a Bell state measurement (BSM) as a means of verify the identity of the signature delegate and an authorization for the signature delegate to sign on behalf of the signature delegator.

In specific embodiments of the system 100, as shown in FIG. 1, signature delegatory (also referred to as the original signer or delegating entity) computing platform 300, such as a personal computer or the like, includes a memory 310 and a processing device 320 in communication with the memory. The memory 310 stores quantum blinder 330 that is executable by the processing device 320 and configured to blind information 340 associated with an event requiring a signature. Blinding provides for subsequent computing platforms, e.g., third-party signature validator computing platform 400, the signature delegate computing platform 500, the delegatory signature authorized computing platform 600 to not have full information about the tasks that they are performing, which ensures that the computing platform tasks are kept secure to measure qubit states.

In specific embodiments of the system 100, third-party signature validator computing platform 400 includes a memory 410 and a processing device in communication with the memory. Memory 410 stores identity verifier that is configured to receive delegate signatures from both the signature delegate computing platform 500 and delegatory signature authorizer computer platform and verify the identity of the signature delegate. Additionally, third-party signature validator computing platform 400 includes a quantum-level computing platform 430 having a quantum memory 440 and at least one quantum processing 420 in communication with the quantum memory 440. As such, the third-party signature validator computing platform 400 may comprise more than one computing devices, such as application servers or the like. Quantum memory 450 stores Bellstate measurement instructions 460 and Von Neumann measurement instructions 470 that are executable by quantum processing device 450. BSM instructions 460 are configured to perform a BSM, which is a joint quantum-level mechanical measurement of two qubits that determines which of the four Bell states the qubits reside in. Von Neumann measurement instructions 470 are configured to perform a Von Neumann measurement, which transforms the state of a quantum particle based on the theory of successive measurements.

In specific embodiments of the system 100, signature delegate (otherwise referred to the delegate or signing entity) computing platform 500 includes a memory 510 and a processing device 520 in communication with the memory. Signature delegate computing platform 500 may comprise a classical/quantum personal computer or one or more other computing devices. Memory 510 stores digital delegatory signature 512. Additionally, signature delegate computing platform 500 includes a quantum-level computing platform 530 having a quantum memory 540 and at least one quantum processing devices 550 in communication with the quantum memory 540. Quantum memory 540 stores quantum particle generator and entangler 560 configured to generate/entangle at least four, and in some embodiments six, quantum particles and retain/assign the particles to the quantum-level computing platforms 430, 530, 630 and 730. Quantum memory 540 additionally includes Bell state measurement instructions 570 that are executable by quantum processing device 450 and are configured to perform a BSM.

In specific embodiments of the system 100, delagatory signature authorizor computing platform 600 includes a memory 610 and a processing device 620 in communication with the memory 610. Signature delegate computing platform 600 may comprise one or more application servers or the like. Memory 610 stores digital delegatory signature 512 and delegator-delegate rules 612. Additionally, signature delegate computing platform 600 includes a quantum-level computing platform 630 having a quantum memory 640 and at least one quantum processing devices 650 in communication with the quantum memory 640. Quantum memory 640 stores Bell state measurement instructions 660 that are executable by quantum processing device 650 and are configured to perform a BSM.

In specific embodiments of the system 100, signature requester computing platform 700 includes a memory 710 and a processing device 720 in communication with the memory 710. Signature requester computing platform 700 may comprise one or more application servers or the like. Memory 710 stores signature confirmer 712 that is configured to compare the information associated with the event to a received delegate signature to confirm that the signature has been successfully received. Additionally, signature requestor computing platform 700 includes a quantum-level computing platform 730 having a quantum memory 740 and at least one quantum processing devices 750 in communication with the quantum memory 740.

Figure 2:
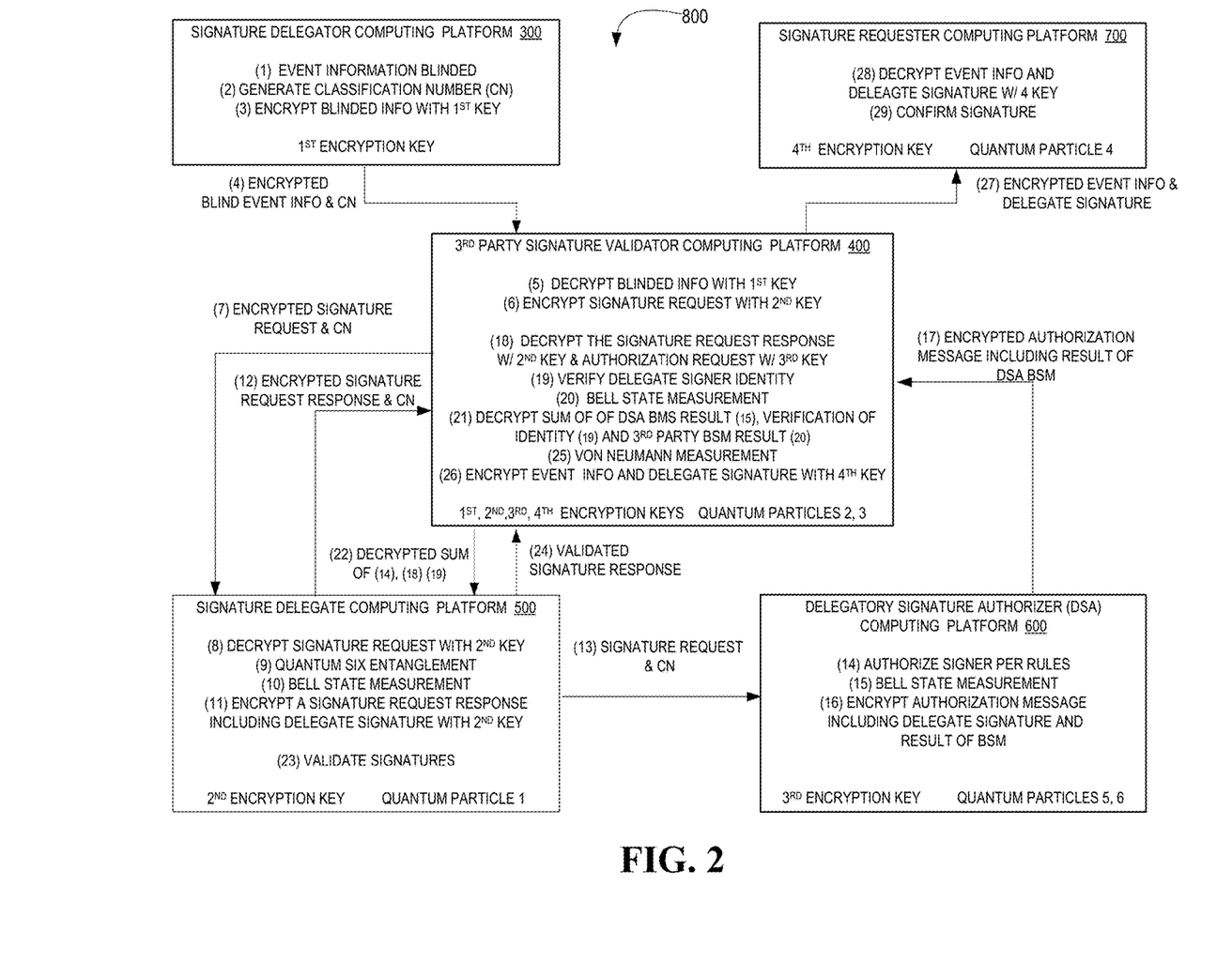
FIG. 2 is block/flow diagram of a system/method for implementing quantum-level cryptography for delegated digital signatures, in accordance with embodiments of the present invention.

Referring to FIG. 2, a block/flow diagram is depicted of a system 800 for quantum-level cryptography of digital delegate signatures, highlighting alternate embodiments of the present invention. It should be noted that while FIG. 2 depicts numbered events, the events are not required to occur in the numbered order and, as such, may occur out of the numbered order and/or, in some instances, concurrently.

As a precursor to conducting an event requiring a digital delegate signature, encryption keys are exchanged between the various computing platforms to allow for information to be exchanged between the third-party signature validator computing platform 400 and the other computing platforms, 300, 500, 600 and 700. Specifically, a first encryption key is shared between the signature delegate computing platform 300 and the third-party signature validator computing platform 400, a second encryption key is shared between the signature delegate computing platform 500 and the third-party signature validator computing platform 400, a third encryption key is shared between the delegatory authorization computing platform 600 and the third-party signature validator computing platform 400, and a fourth encryption key is shared between the signature requester computing platform 700 and the third-party signature validator computing platform 400.

Referring to the signature delegate computing platform 300, at Event (1) information associated with the event (e.g., payment transaction or the like) requiring signature is blinded. As previously discussed, blinding means the quantum-level computing platforms/servers do not possess full information about the processing tasks which they are computing, ensuring the processing tasks are secure to measure qubit states. In specific embodiments of the invention the information is blinded by measuring the particle sequence according to the event information (x), i.e., (x)I=0 & 1 (tangle particle i-th pair) to records x=x(i), x(2) ... x(n), where x(n) is an element of |0>, |1> state. Thus, the event information (x) (n-bit) is blinded as X (2n-bit), i.e., 00,01, 10,11.

At Event (2), in order to distinguish each signature delegate, the signature delegator computing platform 300 generates a classification number (CN) that is converted to quantum state.

At Event (3), the blinded information and the classification number is encrypted using the first encryption key and, at Event (4), is communicated to the third-party signature validator computing platform 400.

Referring to the third-party signature validator (e.g., third-party payment authority or the like) computing platform 400, at Event (5), the encrypted blinded information and CN is received and decrypted using the first encryption key. The third-party signature validator prepares n to quantum entangled state particle pair (not shown in FIG. 2). A quantum entangled state is required so that information that is exchanged and/or evaluated from one computing platform to another is in the form of quantum particles. At Event (6), a signature request is generated and, along with the CN, is encrypted with the second encryption key and, at Event (7) is communicated to the signature delegate computing platform 500.

Referring to signature delegate computing platform 500, at Event (8) the signature request and CN is decrypted using the second encryption key. At Event (9), the quantum-level computing platform of signature delegate computing platform 500 generates/entangles six quantum particles, with quantum particle 1 being retained by the signature delegate computing platform 500, quantum particles 2 and 3 being assigned to the third-party signature validator computing platform 400, quantum particle 4 being assigned to the signature requested computing platform 700 and quantum particles 5 and 6 being assigned to the delegatory signature authorizer computing platform 600. Third-party signature validator computing platform 400 and delegatory signature authorizer computing platform 600 are assigned two quantum particles in order to subsequently perform a full pair Bell state measurement (BSM). In other embodiments of the invention, in which only a half BSM is required to be performed, the third-party signature validator computing platform 400 and/or the delegatory signature authorizer computing platform 600 may be assigned one quantum particle.

At Event (10) a Bell state measurement (BSM) is performed to reconstruct the original state of a teleported particle from half of an entangled pair result (i.e., the so-called "quantum channel"). Performance of the BSM ensures that the same correlated outcome occurs at other quantum-level computing platforms within system 800. At Event (11), a signature request response including the digital delegate signature and CN is encrypted with the second encryption key and, at Event (12), is communicated to the third-party signature validator computing platform 400. At Event (13), the signature request and CN is forwarded/communicated to the delegatory signature authorizer computing platform 600.

Referring to the delegatory signature authorizer (e.g., financial institution or the like) computing platform 600. At Event (14), the signature request is received and rules are accessed to verify that the signature delegate is authorized to perform as a signer for the specific event (i.e., delegate has been designate as a signer for the original signer/delegator and the parameters of the event/financial transaction have been met to allow for the delegate to sign on behalf of the delegator). In response to successful verification, at Event (15) a Bell state measurement (BSM) is performed on particles 5, 6 (i.e., the delegate signs on behalf on the delegator) and the measurement result is recorded. At Event (16) an authorization message including a digital delegate signature (as stored by the delegatory signature authorizer computing platform 600) and the BSM result is encrypted using the third encryption key and, at Event (17), the authorization message is communicated to the third-party signature validator computing platform 400.

Referring again to the third-party signature validator platform 400, at Event (18) the signature request response is decrypted using the second encryption key and the authorization message is decrypted using the third encryption key. At Event (19), the digital delegate signatures in the signature request response and the authorization message are used to verify the identity of the signature delegate (i.e., the signature delegate is the delegate authorized by the delegatory signature authorizer computing platform 600). At Event (20), the third-party assists the signature delegate for transmission of quantum state to be completed with the signature requester by performing a Bell state measurement (BSM) on the quantum particles 2, 3.

At Event (21), the sum of the result of the delegatory signature authorizer BSM (Event 15), the identity verification (Event 19), the third-party BSM (Event 20) is decrypted and, at Event (22) the decrypted sum and the CN are encrypted using second encryption key and communicated to the signature delegate computing platform 600.

Referring again to the signature delegate computing platform 500, at Event (23), the decrypted sum and CN is decrypted using the second decryption key and validates that the delegate signatures previous communicated by the signature delegate computing platform 500 and the delegatory signature authorizer are valid (i.e., rightly added and sent to the third-party). In response to validation, at Event (24) a validated signature response including a digital designate signature is encrypted using the second encryption key and communicated to the third-party signature validator computing platform 400.

Referring again to the third-party signature validator computer program 400, once the validated signature request has been decrypted using the second encryption key, at Event (25) a Von Neumann measurement is carried out on quantum particle 6 to transform the state of the quantum particle and the observables based on performance of successive measurements. In response to completing the Von Neumann measurement, at Event (26) the event information and the digital signature recently received from the signature delegate computing platform 500 are encrypted with the fourth encryption key and, at Event (27), communicated to the signature requester computing platform.

Referring to the signature requester (e.g., a merchant) computing platform 700, at Event (28) the event information and the digital signature is decrypted using the fourth encryption key. At Event (29), quantum particle 3 is measured under base measurement and a classical computing bit measurement is recorded to obtain a digital delegate signature from the delegatory signature authorizer computing platform 600 and the obtained digital delegate signature is compared to the digital delegate signature decrypted at Event (28) to successfully confirm the digital delegate signature.

Figure 3:
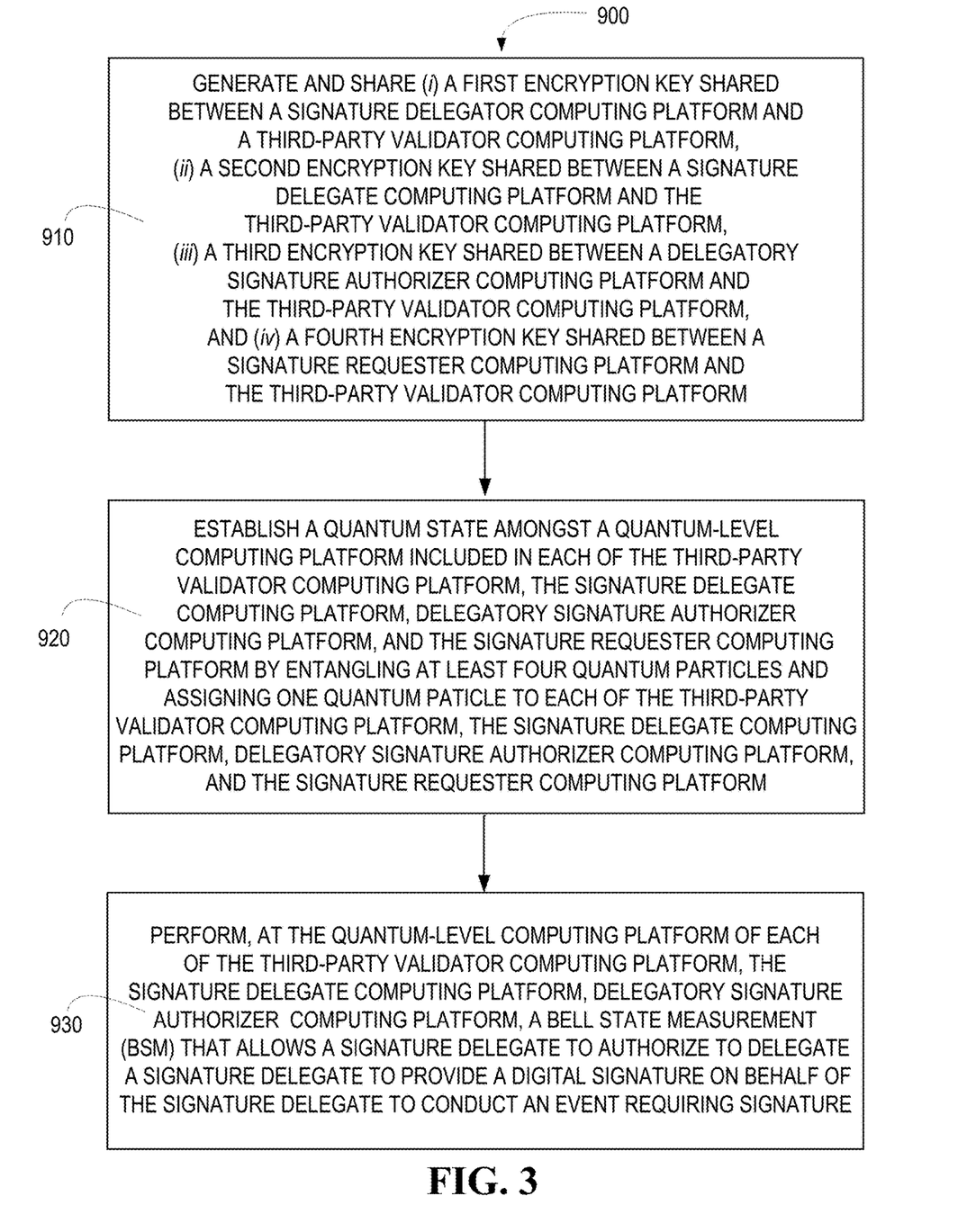
FIG. 3 is a flow diagram of method for implementing quantum-level cryptography for delegated digital signatures, in accordance with embodiments of the present invention.

Referring to FIG. 3, a flow diagram is depicted of a method 900 for quantum-level encryption of digital delegate signatures, in accordance with embodiments of the present invention. At Event 910, encryption keys are generated and shared amongst a third-party signature validator computing platform (e.g., a third-party payment authority) and other computing platforms participating in the delegate signature process. Specifically, a first encryption key is shared between the signature delegate computing platform 300 and the third-party signature validator computing platform 400, a second encryption key is shared between the signature delegate computing platform 500 and the third-party signature validator computing platform 400, a third encryption key is shared between the delegatory authorization computing platform 600 and the third-party signature validator computing platform 400, and a fourth encryption key is shared between the signature requester computing platform 700 and the third-party signature validator computing platform 400.

At Event 920, a quantum state is established between quantum-level computing platforms of the third-party signature validator computing platform, the signature delegate computing platform, the delegatory signature authorizer computing platform and the signature requester computing platform. The quantum state is established by generating and entangling at least four quantum particles, with one of the particles being assigned to the quantum-level computing platforms of each of the third-party signature validator computing platform, the signature delegate computing platform, the delegatory signature authorizer computing platform. In specific embodiments of the method, the quantum-level computing platform of the signature delegate computing platform generates/entangles six quantum particles, in which one quantum particle is retained by the quantum-level computing platform of the signature delegate computing platform, one quantum particle is assigned to the quantum-level computing platform of the signature requester computing platform and two quantum particles are assigned to each quantum-level computing platform of both the third-party signature validator computing platform and the delegatory signature authorizer computing platform.

At Event 930, Bell state measurements (BSMs) are performed at the quantum-level computing platforms of the signature delegate computing platform, the third-party signature validator computing program and the delegatory signature authorizer computing platform to provide a digital signature on behalf of the signature delegate to conduct an event requiring signature.

As evident from the preceding description, the systems, methods and the like described herein represents an improvement in data security and, specifically, security of digital delegate signatures by introduction of quantum-level cryptography. As a result, the present invention provides a process for digital delegate signature distribution that has strong unforgeability (i.e., the delegator or the third-parties participating in the process cannot create a valid delegate signature), identifiability (i.e., any entity can determine the identity of the corresponding delegate from the delegate signature itself) and undeniability (i.e., a signature delegate cannot subsequently reject/repudiate a digital delegate signature once they have created it).

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for quantum-level cryptography of delegated digital signatures, the system comprising:
   (a) a signature delegator computing platform including a first memory and a first processing device in communication with the first memory;
   (b) a third-party validator computing platform including a second memory, a second processing device in communication with the second memory, a first quantum-level memory and a first quantum-level processing device in communication with the first quantum-level memory;
   (c) a signature delegate computing platform including a third memory, a third processing device in communication with the third memory, a second quantum-level memory and a second quantum-level processing device in communication with the second quantum-level memory:
   (d) a delegatory signature authorizer computing platform including a fourth memory, a fourth processing device in communication with the fourth memory, a third quantum-level memory and a third quantum-level processing device in communication with the third quantum-level memory: and
   (e) a signature requester computing platform including a fifth memory, a fifth processing device in communication with the fifth memory, a fourth quantum-level memory and a fourth quantum-level processing device in communication with the fourth quantum-level memory,
   wherein a quantum state is established amongst (b), (c), (d) and (e) by at least one of the first, second, third and fourth quantum-level processing devices entangling at least four quantum particles and assigning at least one of the least four quantum particles to each of (b), (c), (d) and (e), and
   wherein the first, second, and third quantum-level processing devices of (b), (c) and (d) are configured to each perform separate Bell state measurements (BSM) and as a result of the BSMs a signature delegator is allowed to delegate a signature delegate to provide a digital signature on behalf of the signature delegator to conduct an event requiring signature.

2. The system of claim 1, wherein an encryption process is established by generating and sharing (i) a first encryption key shared between the signature delegator computing platform and the third-party validator computing platform, (ii) a second encryption key shared between the signature delegate computing platform and the third-party validator computing platform, (iii) a third encryption key shared between the delegatory signature authorizer computing platform and the third-party validator computing platform, and (iv) a fourth encryption key shared between the signature requester computing platform and the third-party validator computing platform.

3. The system of claim 2, wherein the signature delegator computing platform further comprises first instructions stored in the first memory, executable by the first processing device and configured to:
   generate a classification number and convert the classification number to a quantum state,
   blind information associated with the event,
   encrypt the blinded information and the classification number using the first encryption key, and
   communicate the encrypted and blinded information and the encrypted classification number to the third-party validator computing platform.

4. The system of claim 3, wherein the third-party validator computing platform further comprises second instructions stored in the second memory, executable by the second processing device and configured to:
   receive and decrypt the encrypted and blinded information and encrypted classification number using the first encryption key,
   encrypt (i) a signature request and the classification number using the second encryption key, and (ii) the classification number using the third encryption key, and
   communicate (i) the encrypted signature request and the encrypted classification number to the signature delegate computing platform and (ii) the encrypted classification number to the delegatory signature authorizer computing platform.

5. The system of claim 4, wherein the signature delegate computing platform further comprises third instructions stored in the third memory, executable by the third processing device and configured to:
   receive and decrypt the encrypted signature request and the encrypted classification number using the second encryption key,
   implement the second quantum-level processing device of the signature delegate computing platform to conduct a first Bell state measurement (BSM),
   encrypt a signature request response including an electronic signature of the delegate and the classification number, and
   communicate (i) the encrypted signature request response, and the encrypted classification number to the third-party validator computing platform and (ii) the signature request to the delegatory signature authorizer.

6. The system of claim 5, wherein the delegatory signature authorizer computing platform further comprises fourth instructions stored in the fourth memory, executable by the fourth processing device and configured to:
   receive and decrypt the encrypted classification number using the third encryption key;
   receive the signature request,
   verify that the delegate has signature authorization for the delegator and a signature requester,
   implement the third quantum-level processing device of the delegatory signature authorizer computing platform to conduct a second Bell state measurement (BSM),
   encrypt a signature authorization response including the electronic signature of the delegate, results of the second BSM and the classification number, and
   communicate the encrypted signature authorization response, the encrypted results of the second BSM and the encrypted classification number to the third-party validator computing platform.

7. The system of claim 6, wherein the second instructions are further configured to:

receive and decrypt (i) the encrypted signature request response using the second encryption key, and (ii) the encrypted signature authorization response using the third encryption key, verify an identity of the signature delegate based on the electronic signature in (i) the signature request response and (ii) the signature authorization response, implement the first quantum-level processing device of the third-party validator computing platform to conduct a third Bell state measurement (BSM), decrypt a sum of (i) a result of the identity verification, (ii) the result of the second BSM and, (iii) the result of the third BSM and communicate (a) the decrypted sum to the signature delegate computing platform and (b) the delegate signatures received from the signature delegate computing platform to the delegatory signature authorizer computing platform.

8. The system of claim 7, wherein the third instructions are further configured to:

validate the delegate signatures; and communicate a validated signature response to the third-party validator computing platform.

9. The system of claim 8, wherein the second instructions are further configured to:

implement the first quantum-level processing device of the third-party validator computing platform to conduct a Von Neumann measurement, and encrypt the information associated with the event and the delegate signature using the fourth encryption key;

communicate the encrypted information associated with the event and the encrypted delegate signature to the signature requester computing platform.

10. The system of claim 9, wherein the signature requester computing platform further comprises fifth instructions stored in the fifth memory, executable by the fifth processing device and configured to:

receive and decrypt the information associated with the event and delegate signature using the fourth encryption key, and confirm the delegate signature.

11. The system of claim 1, wherein the second quantum-level processing device of the signature delegate computing platform is configured to prepare the at least four quantum particles and communicate at least one separate quantum particle from the least four quantum particles to each of (b), (d) and (e).

12. The system of claim 11, wherein the second quantum-level processing device of the signature delegate computing platform is configured to prepare six quantum particles of the at least four quantum particles, retain a first one of the six quantum particles, and assign (i) a second and third ones of the six quantum particles to the first quantum-level processing device of the third-party validator computing platform, (ii) a fourth one of the six quantum particles to the fourth quantum-level processing device of the signature requester computing platform, and (iii) a fifth and sixth ones of the six quantum particles to the third quantum-level processing device of the delegatory signature authorizer computing platform.

13. A computer-implemented method for quantum-level cryptography of delegated digital signatures, the method is executed by one or more computing processing devices and comprising:

generating and sharing (i) a first encryption key shared between a signature delegator computing platform and a third-party validator computing platform, (ii) a second encryption key shared between a signature delegate computing platform and the third-party validator computing platform, (iii) a third encryption key shared between a delegatory signature authorizer computing platform and the third-party validator computing platform, and (iv) a fourth encryption key shared between a signature requester computing platform and the third-party validator computing platform;

establishing a quantum state amongst a quantum-level processing device included within each of the third-party validator computing platform, the signature delegate computing platform, the delegatory signature authorizer computing platform and the signature requester computing platform by entangling at least four quantum particles and assigning at least one of the least four quantum particles to each of the quantum-level processing devices of the third-party validator computing platform, the signature delegate computing platform, the delegatory signature authorizer computing platform and the signature requester computing platform; and performing, at the quantum-level processing devices of each of the third-party validator computing platform, the signature delegate computing platform, the delegatory signature authorizer computing platform, a Bell state measurement (BSM) that results in allowing a signature delegator to delegate a signature delegate to provide a digital signature on behalf of the signature delegator to conduct an event requiring signature.

14. The computer-implemented method of claim 13, wherein establishing a quantum state further comprises preparing, by the quantum-level processing device of the signature delegate computing platform, six quantum particles of the at least four quantum particles and retaining a first one of the six quantum particles, and assigning (i) a second and third ones of the six quantum particles to the quantum-level processing device of the third-party validator computing platform, (ii) a fourth one of the six quantum particles to the quantum-level computing platform of the signature requester processing device, and (iii) a fifth and sixth ones of the six quantum particles to the quantum-level processing device of the delegatory signature authorizer computing platform.

15. The computer-implemented method of claim 14, further comprising generating, by the signature delegator computing platform, a classification number and converting the classification to a quantum state;

blinding, by the signature delegator computing platform, information associated with the event; and encrypting the blinded information and the classification number using the first encryption key and communicating the encrypted and blinded information and the encrypted classification number to the third-party validator computing platform.

16. The computer-implemented method of claim 15, further comprising:

receiving and decrypting, by the signature delegate computing platform, an encrypted signature request and the classification number using the second encryption key, implementing the quantum-level processing device of the signature delegate computing platform to conduct a first Bell state measurement (BSM), encrypting, by the signature delegate computing platform, a signature request response including an electronic signature of the delegate and the classification number, and communicating, by the signature delegate computing platform, (i) the encrypted signature request, and the encrypted classification number to the third-party validator computing platform and (ii) the signature request to the delegatory signature authorizer.

17. A non-transitory computer-readable medium having stored thereon sequences of instructions which, when executed by at least one processor, cause the at least one processor to:

generate and share (i) a first encryption key shared between a signature delegator computing platform and a third-party validator computing platform, (ii) a second encryption key shared between a signature delegate computing platform and the third-party validator computing platform, (iii) a third encryption key shared between a delegatory signature authorizer computing platform and the third-party validator computing platform, and (iv) a fourth encryption key shared between a signature requester computing platform and the third-party validator computing platform;

establish a quantum state amongst a quantum-level processing device included within each of the third-party validator computing platform, the signature delegate computing platform, the delegatory signature authorizer computing platform and the signature requester computing platform by entangling at least four quantum particles and assigning at least one of the at least four quantum particles to each of the quantum-level processing devices of the third-party validator computing platform, the signature delegate computing platform, the delegatory signature authorizer computing platform and the signature requester computing platform;

perform, at the quantum-level processing devices of each of the third-party validator computing platform, the signature delegate computing platform, the delegatory signature authorizer computing platform, a Bell state measurement (BSM) that results in allowing a signature delegator to delegate a signature delegate to provide a digital signature on behalf of the signature delegator to conduct an event requiring signature.

18. The non-transitory computer-readable medium of claim 17, wherein the instructions further cause the at least one processor to prepare, by the quantum-level processing device of the signature delegate computing platform, six quantum particles of the at least four quantum particles and retaining a first one of the six quantum particles, and assigning (i) a second and third ones of the six quantum particles to the quantum-level processing device of the third-party validator computing platform, (ii) a fourth one of the six quantum particles to the quantum-level processing device of the signature requester computing platform, and (iii) a fifth and sixth ones of the six quantum particles to the quantum-level processing device of the delegatory signature authorizer computing platform.

19. The non-transitory computer-readable medium of claim 18, wherein the instructions further cause the at least one processor to (i) generate a classification number and convert the classification to a quantum state, (ii) blind information associated with the event, (iii) encrypt the blinded information and the classification number using the first encryption key and (iv) communicate the encrypted and blinded information and the encrypted classification number to the third-party validator computing platform.

20. The non-transitory computer-readable medium of claim 19, wherein the instructions further cause the at least one processor to (i) receive and decrypt an encrypted signature request and the classification number using the second encryption key, (ii) implement the quantum-level processing device of the signature delegate computing platform to conduct a first Bell state measurement (BSM), (iii) encrypt a signature request response including an electronic signature of the delegate and the classification number, and (iv) communicate (a) the encrypted signature request, and the encrypted classification number to the third-party validator computing platform and (b) the signature request to the delegatory signature authorizer.

* * * * *